(12) United States Patent
Jensen et al.

(10) Patent No.: US 9,990,135 B2
(45) Date of Patent: Jun. 5, 2018

(54) PROVIDING MEMORY USAGE ANALYSIS BY ATTRIBUTING MEMORY ALLOCATIONS TO DEVELOPMENT COMPONENTS

(71) Applicant: Apple Inc., Cupertino, CA (US)

(72) Inventors: Bradley Joel Jensen, San Francisco, CA (US); Carter Peterson, San Francisco, CA (US); Stephen J. Rhee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/275,306

(22) Filed: Sep. 23, 2016

(65) Prior Publication Data

US 2018/0088821 A1   Mar. 29, 2018

(51) Int. Cl.
*G06F 12/00*  (2006.01)
*G06F 3/06*   (2006.01)
*G06F 12/02*  (2006.01)

(52) U.S. Cl.
CPC .......... *G06F 3/0607* (2013.01); *G06F 3/0631* (2013.01); *G06F 3/0685* (2013.01); *G06F 12/023* (2013.01); *G06F 2212/1044* (2013.01)

(58) Field of Classification Search
CPC ..... G06F 3/0607; G06F 3/0685; G06F 12/023
USPC ......................................................... 711/170
See application file for complete search history.

(56) References Cited

U.S. PATENT DOCUMENTS

| | | | |
|---|---|---|---|
| 6,633,954 B1 * | 10/2003 | Don ..................... | G06F 3/0601 711/114 |
| 7,895,579 B2 | 2/2011 | Guerrera et al. | |
| 9,141,510 B2 | 9/2015 | Hsia | |
| 2002/0095403 A1 * | 7/2002 | Chandrasekaran . | G06F 12/0804 |

\* cited by examiner

*Primary Examiner* — Jae Yu
(74) *Attorney, Agent, or Firm* — Womble Bond Dickinson (US) LLP (57) ABSTRACT

Described are a system and technique for collecting stack trace information of devices and analyzing this information to provide metrics with respect to memory usage. The memory analysis includes attributing the memory usage to particular development components by traversing a stack trace. For example, the development components may correspond to a classification used for a particular development effort such as a group of classes, a sub-project, or a development team. As a result, the system may produce various metrics that produce memory usage information attributable to a more meaningful conceptual unit rather than, for example, function names. Accordingly, these attributions may be analyzed for forensic purposes to get a more meaningful picture of sources and causes of memory usage.

22 Claims, 10 Drawing Sheets

PROVIDING MEMORY USAGE ANALYSIS BY ATTRIBUTING MEMORY ALLOCATIONS TO DEVELOPMENT COMPONENTS

TECHNICAL FIELD

This disclosure relates generally to the field of analyzing memory usage of a device. More specifically, this disclosure relates to attributing memory allocations to a particular development component.

BACKGROUND

The overall user experience of a device may be affected when the performance of one or more processes running on the device are hindered due to the availability of memory resources. Accordingly, software developers are often cognizant of managing memory resources when developing applications, and thus, often take advantage of the many available memory debugging tools. Depending on the development environment, these debugging tools often provide information for heap memory allocations based on a stack trace (or stack backtrace, or stack traceback). For example, a stack trace may include information of stack frames at a certain point in time during the execution of a program. Tools that merely rely on the stack trace, however, are often tedious to use, and accordingly, not always developer friendly with respect to analyzing heap memory allocations.

For example, current tools minimally process the stack trace information before displaying it to the user. Accordingly, traditional tools often require a developer to analyze a large number of lines of text or manage complicated relationship representations. Moreover, heap memory allocations are often a result of various interrelated programs (or processes) that are not easily traceable from a mere unprocessed listing (or "dump") of a stack trace. Accordingly, when tracking memory usage for these interrelated programs, for example, between application builds, it is often difficult to attribute variances of memory usage to a particular source. Thus, traditional memory analysis tools are often ill-suited for analyzing memory usage during coordinated or complex software development efforts.

SUMMARY

Described is a system (and technique) for collecting memory usage information of devices and attributing the memory usage to a conceptual unit rather than to mere functions as with traditional memory analysis tools. Accordingly, in some embodiments, the system may attribute the source of memory usage to a "development component." For example, the development component may correspond to a conceptual unit relevant to software development efforts. In one embodiment, a development component may include be a predefined subset of a larger framework (or toolset, or platform, etc.) of software components. For example, the development component may include a collection (or subset) of one or more software components such as libraries, processes, services, classes, objects, modules, functions, and the like. In addition, a development component may correspond to, or be associated with, a software development team, project, application category, or other classification used for organizing software development efforts.

In some embodiments, the system may analyze memory usage using a heuristic process of traversing a stack trace to identify functions (or methods, procedures, subroutines, subprograms, and the like) and attributing a memory allocation to a particular development component. Based on the attribution, the system may produce various metrics of memory usage for particular development components. Accordingly, this information may be analyzed for forensic purposes to get a more meaningful picture of sources and causes of memory usage that were previously not available from traditional tools. Thus, when memory usage issues are identified, some embodiments of the system described herein may provide an effective tool for identifying the appropriate development component responsible for allocating the memory. For example, based on the memory analysis, it may be determined that certain spikes in memory usage are attributable to particular development components. Accordingly, during the software development process (e.g. release of a new build) developers corresponding to the development component may be identified and assigned to address such memory usage issues. Thus, in some embodiments, the system herein may be used to improve overall development efforts.

In one embodiment, described is a method (and system) of analyzing memory usage. The method may include receiving a log tracking memory usage of one or more processes executing on a device. The log, for example, may include a stack trace at a time of initiating a memory allocation function by one of the processes. The method may include converting memory addresses listed in the stack trace to a list of functions. The method may also include heuristically analyzing the stack trace and attributing the memory allocation function to a development component associated with a function within the stack trace. When attributing memory allocations, the method may also consider an association type between a function and a development component such as whether a development component is strongly or weakly associated with its associated function. Accordingly, the method may provide information for the memory usage attributable to the development component including at least an amount of memory allocated by the memory allocation function. For example, in one embodiment, the provided memory usage information may include various metrics such as memory usage of development components across a period of time, application builds, etc.

Accordingly, the methods (and systems) described herein may attribute memory usage to a potentially more meaningful source within the context of software development efforts.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Described is a system and technique for collecting and analyzing memory usage information of one or more devices. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

As described above, the disclosure relates to collecting memory usage information from a device and analyzing the information to attribute usage of the memory to a conceptual unit. Such collecting and analyzing may occur within an operating environment.

Figure 1:
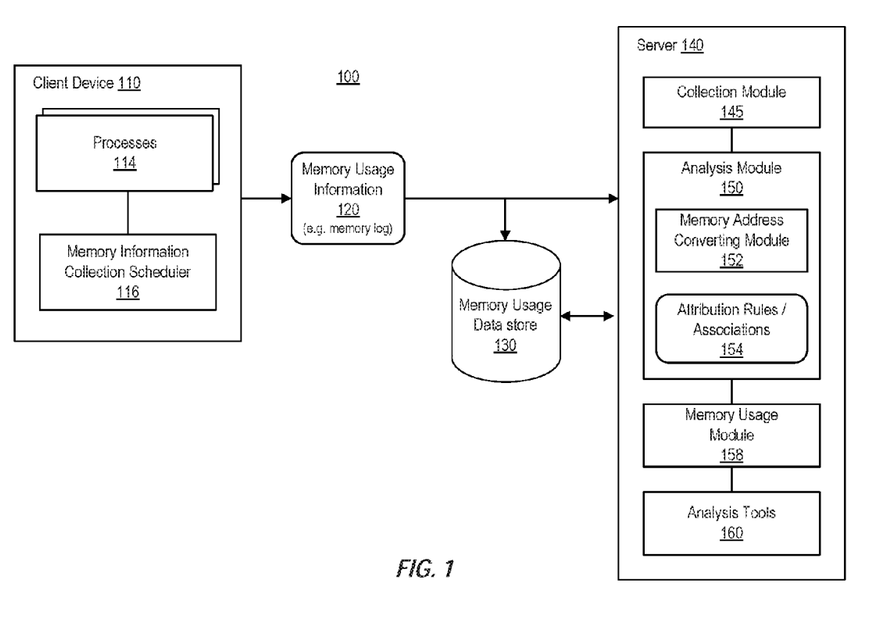
FIG. 1 is a block diagram illustrating an example operating environment overview according to an embodiment of the disclosure.

FIG. 1 is a block diagram illustrating an example operating environment overview according an embodiment of the disclosure. As shown, the system 100 may include a client device 110 and server 140, which may be connected via a network. The client device 110 may be any type of computing device such as a smartphone, tablet, laptop, desktop, wearable device (e.g. smartwatch), VR headset, set-top-box, etc., and the server 140 may be any kind of server (or computing device, or another client device 110), which may be a standalone device, or part of a cluster of servers and may include a cloud-based server, application server, backend server, or combination thereof. The network may be any suitable type of wired or wireless network such as a local area network (LAN), a wide area network (WAN), or combination thereof.

One or more processes 114 (or threads, services, applications, etc.) may execute on the client device 110 and a memory information collection scheduler 116 may collect memory usage information for the one or more processes 114. In one embodiment, the processes 114 may be part of a larger framework of services, classes, protocol, etc. For example, in one embodiment, the processes 114 may be one or more processes 114 that run as a background process (e.g. a daemon) of the client device 110. For example, the background process may relate to a framework of location service tools (e.g. location tracking using GPS positioning functions on the client device 110). Accordingly, as further described herein, many different development components within the larger unit of such a framework may be attributed with memory usage.

As described, the system may collect memory usage information 120. In one embodiment, the memory usage information 120 may be collected in response to a user selecting an option to log memory usage. For example, this logging may record additional information when memory is allocated that would typically be used for debugging purposes. The memory usage information 120 may include various forms of information including allocations provided in heaps, stacks, or other allocations. For example, the information may include data relating to leaked or abandoned allocations, types of objects on the heap, usage of address space by processes, page information such as whether a page has been written back to a storage or disk (e.g. whether the page is "dirty"), etc., or any other data related to memory usage of processes. In addition, in one embodiment, the memory information may include a stack trace at the time a memory allocation was initiated (or called). In addition, the memory usage information may also include more general forms of memory usage (e.g. total amount of physical memory usage, etc.). The memory usage information 120 may be collected based on a schedule managed by a memory information collection scheduler 116. For example, the memory information collection scheduler 116 may schedule the collection of memory information tailored to one or more processes. For instance, using the example of location services, the memory information collection scheduler 116 may collect information using an aggressive time frame (e.g. short time intervals) due to relatively frequent retrieval of data (e.g. position coordinates) required for tracking a location of a device (e.g. during the use of a map application).

Once collected, the memory usage information 120 may be transmitted, via the network, to the server 140 for analysis as further described herein. In one embodiment, the memory usage information 120 may be sent as a log (or log file) to the server 140. The log may include any suitable file format or data structure for storing the memory usage information 120. In one embodiment, the log may include stack trace information for heap memory allocation as described herein.

The system may store the memory usage information 120 in a memory usage data store 130, which may be part of, or separate from, the server 140. The server 140 may include a collection module 145, and analysis module 150, and analysis tools 160. The collection module 145 may collect and process the memory usage information 120. The analysis module 150 may analyze the memory usage information, for example, to attribute memory allocations to one or more functions. Such attribution may be based on various attribution rules/associations 154 (e.g. for attributing memory usage to a development component) as further described herein. In addition, the analysis module 150 may include a memory address converting module 152 to convert (or symbolicate) the memory usage information 120. For example, memory address converting module 152 may convert various memory addresses, pointers, etc. into function names. In one embodiment, the memory address converting module 152 may work in conjunction with a debugger (or development environment) to identify function names. For example, the system may utilize various files that are linked to processes or functions during a conversion process. The server 140 may also include a memory usage module 158 that provides memory usage statistics, graphs, charts, etc. based on attributing the memory usage to, for example, various development components as further described herein. In addition, the server 140 may include various analysis tools 160 to allow a user to review and analyze the processed memory usage information provided by the system. For example, a user may navigate and inspect memory usage information (e.g. navigate a development-component-based memory tree) on a per software version, or per development component basis.

Figure 2:
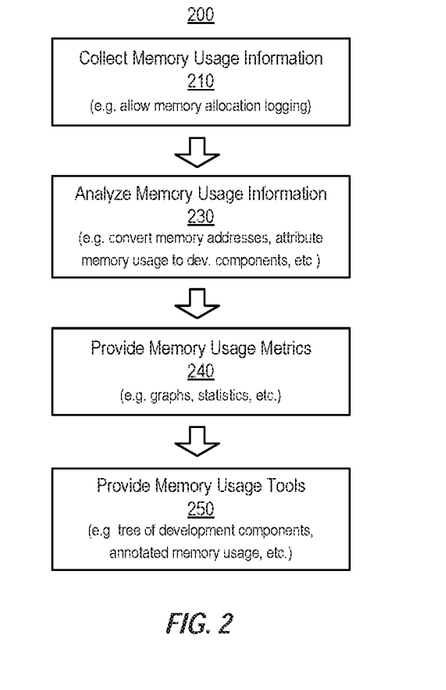
FIG. 2 is a process flow diagram of collecting, analyzing, and providing information regarding memory usage of a device according to an embodiment of the disclosure.

FIG. 2 is an example process flow diagram of an overview of collecting, analyzing, and providing memory usage information of a device according to an embodiment of the disclosure. The process 200 may be performed, for example, by one or more functions of system 100 (e.g. server 140). The system may collect memory usage information 210 for a device (e.g. client device 110) as described above and then analyze the memory usage information 230. This analysis process may include various operations. For example, in one embodiment, the system may convert (or symbolicate) the information within the memory log. For example, the log may include usage data in a "raw" form, and accordingly, pointers and memory addresses may be converted into function names. As further described herein, the system may analyze a stack trace by traversing (or "walking") the stack. The analysis may include attributing the memory usage (e.g. memory allocation) to a particular development component. The attribution process may determine a development component implicated by one or more functions within the stack trace based on determining predetermined associations between one or more functions and development components. These associations may provide a heuristic tool to identify development components that may be responsible for allocating memory. Based on the analysis, the system may also provide memory usage metrics 240. For example, the system may provide memory usage information in the form of readable data such as charts as further described herein. In addition, the system may also provide memory usage tools 250 (e.g. analysis tools 160) as described above.

Figure 3:
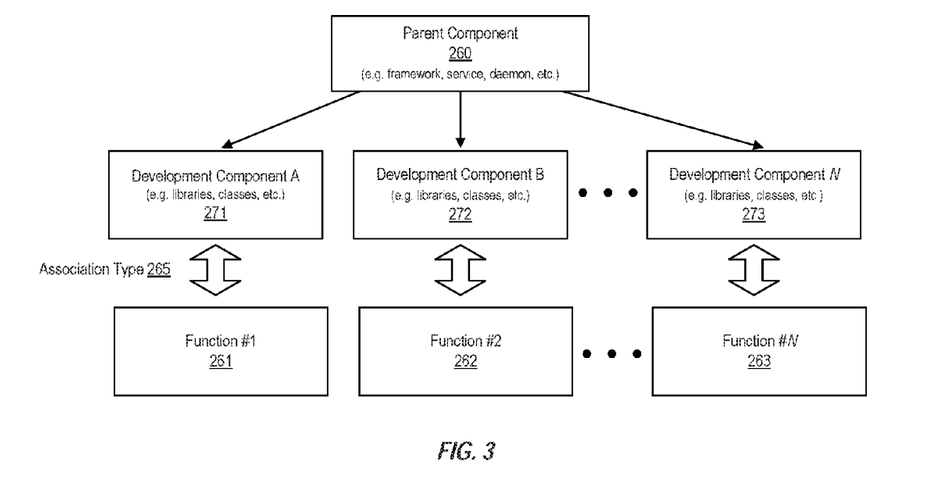
FIG. 3 is a diagram illustrating an example overview of relationships and associations between functions and development components according to an embodiment of the disclosure.

FIG. 3 shows an example overview of relationships and associations between functions and development components according to an embodiment of the disclosure. In one embodiment, the system may aim to identify sub-units or categories that may fall under a particular parent component 260 within the context of a development environment. As referred to herein, the parent component 260 may include a framework, service, process, or other unit or collection of software components that are stored on, or accessible by, a device (e.g. client device 110). In one example, the parent component 260 may include one or more processes (e.g. processes 114) such as a daemon process (e.g. location services) executing on the device. In another example, the parent component 260 may include a framework of classes, objects, libraries, protocols, etc. that may be accessed by processes initiated by of various applications installed on, or accessed by, the device.

As discussed above, because these functions may be called or accessed by various interrelated applications (or programs) and services, identifying function-based memory usage is often not a valuable metric for development efforts. The parent component 260 due its size, complexity, or other characteristics, may be organized or divided into development components (e.g. 271-273). Accordingly, functions may be associated with one or more development components. For example as shown, functions 261, 262, and 263, may each be associated with a development component 271, 272, 273 respectively. For example, Function #1 261 would be considered the respective function for Development Component A 271 (and vice versa), Function #2 262 the respective function for Development Component B 272, and so on (e.g. Function #N 263 respective function for Development Component N 273).

In addition, the system may also store an association type 265 identifying or categorizing a type of association between a development component and the respective function (or stated as the development component and its respective function). For example, the association type 265 may be selected from a set of categories, priority levels, or any other structure to distinguish between different types of associations. In one embodiment, the association type 265 may indicate a strength of the association between a development component and the respective function (e.g. strong vs. weak). The system may use the association type 265 for the attribution process as further described herein. When determining an association type 265, the system may refer to a predefined list (or table, or other data structure) of functions (e.g. function names) that are associated with particular development components. For example, the association type 265 may identify a preference of attributing certain development components with a memory allocation. For example, in one embodiment, a preference or priority of the association type may include attributing a development component having a strong association with its function over a development component having a weak association with its function when attributing a memory allocation.

It should be noted that it is contemplated that any suitable form of identifiers may be used such as strong/weak as described, or high/low, etc., as well as categories, groups, tier levels, etc. In one embodiment, the associations may be a one-to-one association. In addition, it should also be noted that not all functions may be associated with a development component. In addition, due to the interrelated nature of development efforts, in one embodiment, the system may employ a heuristic attribution process and attempt to find a "closest" or "best" attribution using the association types as described above.

Figure 4:
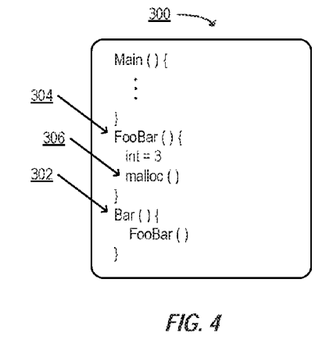
FIG. 4 is a diagram illustrating an example of program code including a function that initiates a memory allocation according to an embodiment of the disclosure.
Figure 5:
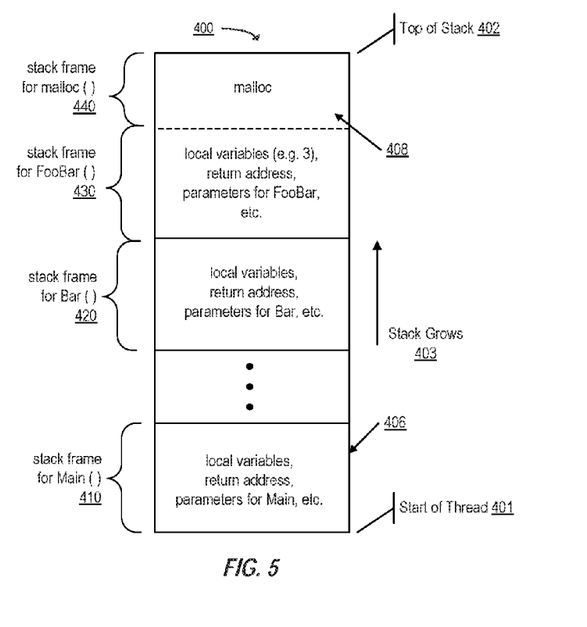
FIG. 5 is a diagram illustrating an example stack trace for the memory allocation initiated by the function as shown in FIG. 4 according to an embodiment of the disclosure.

FIGS. 4 and 5 show an example of functions and a corresponding stack trace for a memory allocation according to an embodiment of the disclosure. FIG. 4 shows an example of a program 300 (or program code) that initiates a memory allocation according to an embodiment of the disclosure. In this example, the program 300, which may be part of an application (e.g. installed or accessed by the client device 110), includes function "Bar ( )" 302 that calls another function "FooBar ( )" 304. In other words, function 302, may be identifies as a caller, and function 304 may be identified as a callee. Accordingly, in one embodiment, function 302 may be deemed as being the owner (or creator) of function 304. As shown, function 304 initiates (or references an instruction to initiate) a memory allocation function, which in this example is a malloc ( ) function 306. Accordingly, in one embodiment, function 304 may be deemed as being responsible for initiating a memory allocation. In another example, function 304 may be deemed as creating or requesting a memory allocation, or other similar term. In some instances, the sequence of calls to various functions may provide information on the degree of attenuation between functions and the memory allocation (e.g. malloc function 306). Although a malloc function is shown, other memory allocation functions (including instructions in various programming languages) or other techniques to allocate memory are also contemplated.

FIG. 5 is a diagram illustrating an example stack trace for the memory allocation initiated by the function as shown in FIG. 4 according to an embodiment of the disclosure. As shown, a stack trace 400 may include one or more frames (or stack frames) 406. Typically, the frames 406 may include various forms of data including, for example, local variables, a return address, parameters for the corresponding function, etc. In one embodiment, the frames of the stack trace are created at a start of the thread 401 (e.g. bottom of the stack) and the stack grows 403 in a direction as shown to the memory allocation 408 (e.g. malloc function in this example), which is at a top of the stack 402. As shown in this example, frame 410 corresponding to the main function may be positioned at the bottom of the stack trace 400. In addition, frame 420 (e.g. a frame corresponding to the Bar ( ) function) may be created in response to calling (or initiating) function 302 (e.g. Bar ( ) function). As described above, function 302 may call the function 304 (e.g. FooBar ( ) function), and accordingly, a frame 430 (e.g. a frame corresponding to the FooBar ( ) function) may be created in response to calling (or initiating) function 304. As shown, function 304 initiates (or calls, or instructs) the malloc function ( ) 306, and accordingly, frame 440 (e.g. a frame for the malloc ( )) may be created.

As described above, in one embodiment, the memory usage information includes a stack trace 400 at the time of initiating a memory allocation function (e.g. function 306). Accordingly, in such embodiments, the stack trace 400 will include a structure as shown in this example wherein the memory allocation 408 is at the top of the stack 402. It should be noted, however, that stack traces taken at other times are also contemplated. It should be noted that the embodiments described herein are not limited to a particular language (e.g. C-style programming language) and may be implemented using other programming languages or development environments.

Figure 6A:
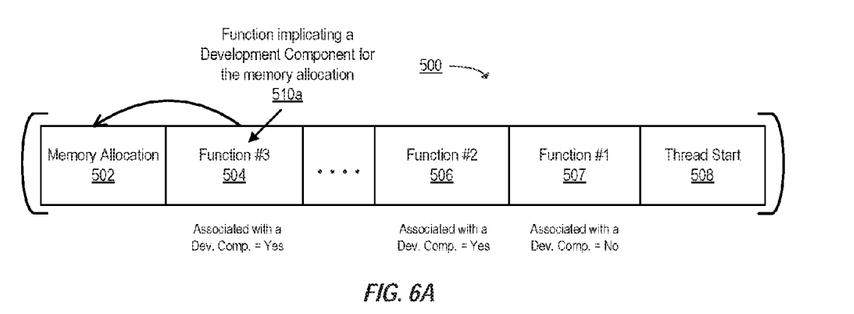
FIGS. 6A and 6B are diagrams illustrating examples of an attribution process based on a positioning of functions within a stack trace according to an embodiment of the disclosure.
Figure 6B:
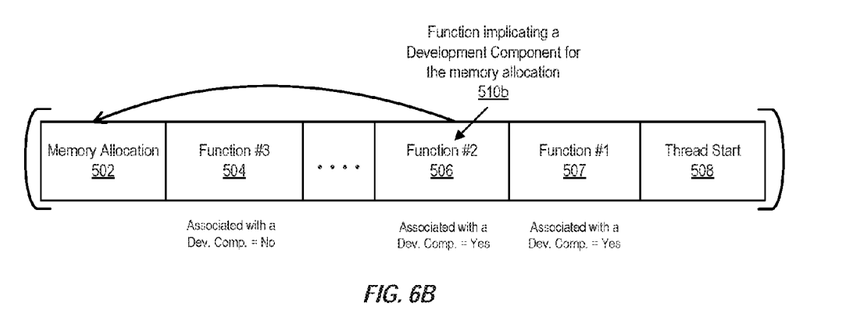

FIGS. 6A and 6B are diagrams illustrating examples of an attribution process based on a positioning of functions within a stack trace according to an embodiment of the disclosure. These examples show a positioning of a set of functions 500 within a stack trace. As shown, the stack trace may include a thread start 508 and a sequence of functions (e.g. Functions #1 507, Functions #2 506, and Functions #1 504 as shown) and a memory allocation 502, which may also be a function (e.g. malloc). The sequence of functions may be based on a calling order as preserved by the stack data structure (e.g. last-in, first-out, LIFO). The system may determine this positioning of the functions by traversing (or "walking") the stack trace. For example, the system may traverse the stack trace from a direction starting from a thread start 508 to the memory allocation 502, or from a direction starting the memory allocation 502 to the thread start 508. As described, in some embodiments, the relative position a function from the memory allocation 502 may be used to determine a degree of attenuation between functions and the memory allocation 502, or degree in which a particular function is "responsible" for calling the memory allocation 502 (e.g. functions nearest the allocation are more responsible for a memory allocation). For example, in some embodiments, attributing a development component with a memory allocation may include determining the function that is both 1) nearest the memory allocation 502 and 2) associated with a development component (or particular development component). For example, as shown in FIG. 6A, Function #3 504 and Function #2 507 are each associated with a development component as indicated. Accordingly, Function #3 504, which is nearer (or closer) to the memory allocation 502 than Function #2 506, is the function implicating its respective development component for the memory allocation 510a. Accordingly, due to the implication, the respective development unit associated with Function #3 504 may be attributed with the memory allocation 502.

FIG. 6B shows another example. As shown, Function #1 507 and Function #2 506 are each associated with a development component as indicated. However, Function #3 although nearest the memory allocation 502, is not associated with a development component, and therefore, not implicated. Instead, Function #2 506, which is nearer (or closer) to the memory allocation 502 than Function #1 507, may be the function implicating its respective development component for the memory allocation 510b. Accordingly, as shown in these examples, the attribution may be based on whether a function is associated with a development component, and based on the positioning of the function with the stack trace. In addition, in some embodiments, the system may also consider a type of association when performing the attribution process as described in FIG. 7.

Figure 7:
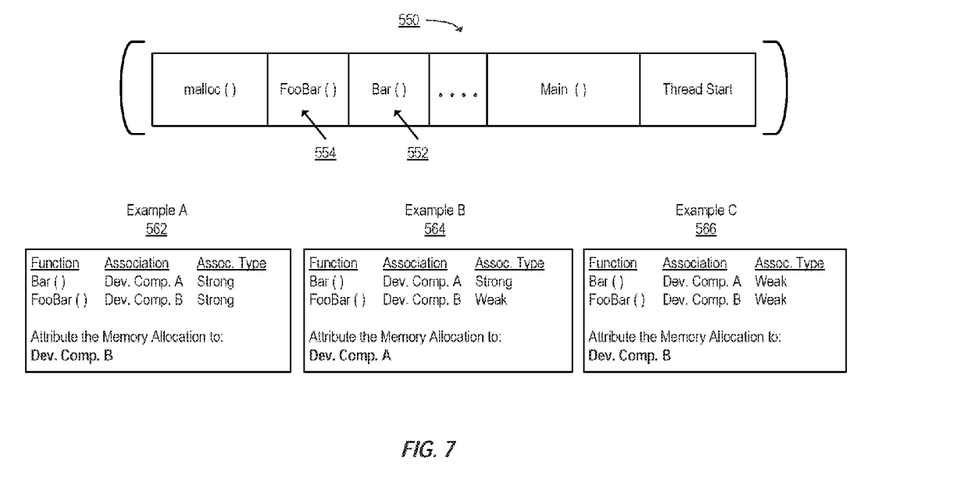
FIG. 7 is a diagram illustrating an example of an attribution process based on a positioning of the functions and an association type according to an embodiment of the disclosure.

FIG. 7 is a diagram illustrating an example of an attribution process based on a positioning of the functions and an association type according to an embodiment of the disclosure. As described above, the system may attribute the memory allocation based on whether a function is associated with a development component. In addition, as shown in this example, the attribution process may also be based on an association type (e.g. association type 265) between a development component and its associated function. As shown, and with reference to FIGS. 4 and 5, FooBar ( ) 554 and Bar ( ) 552 are functions within the sequence of functions 550 within the stack trace (e.g. stack trace 400). As shown, each of FooBar ( ) 554 and Bar ( ) 552 are associated with a development component. As shown in Examples A, B, and C, Development Component A is associated with Bar ( ) and Development Component B is associated with FooBar ( ) 554. With respect to Example A 562, both Development Component A and Development Component B are strongly associated with their respective functions (e.g. Bar ( ) 552 and FooBar ( ) 554 respectively). Accordingly, in Example A 562, the memory allocation may be attributed to Development Component A as its function FooBar ( ) 554 is nearest the memory allocation function (malloc ( ) function) amongst the development components that are strongly associated with their respective function.

With respect to Example B 564, the stack trace includes both a development component strongly associated with its respective function (Development Component A) and a development component weakly associated with its respective function (Development Component B). As described above, the system may prioritize an attribution based on the association type (e.g. strong vs. weak). In this example, the system may prioritize a strongly associated development component over a weakly associated development component, and accordingly, even though FooBar ( ) is nearer (or closer) to the memory allocation function than Bar ( ), Development Component A may be attributed with the memory allocation. In other words, in one embodiment, a strong association may override a weak association even the strong association is farther away from the memory allocation than the weak association.

With respect to Example C 566, although each of Bar ( ) 552 and FooBar ( ) 554 are associated with a development component, neither of the association types are a prioritized association type (e.g. neither are a strong association), and accordingly, Development Component B, which is associated with FooBar ( ) 554 (e.g. the function nearest the memory allocation function), is attributed with the memory allocation.

It should be noted that the examples of association types described above are only examples and various other forms of categorizations are contemplated. For example, as described above, a tier level may be employed. For example, a tier 2 association type may be prioritized over of a tier 3 association type, a tier 1 prioritized over a tier 2, etc. In addition, the categorization scheme may be specialized based on the types of development components or the types of functions being analyzed. In addition, other characteristics may also be considered such as a time of allocation, type of device, current processes executing, etc. In addition, various other attributes may also be considered such as attributes related to the characteristics of the subject device such as memory capacity, processing capability, device version, software version (e.g. OS release), power capacity, storage, etc. Accordingly, in one embodiment, various attributes or characteristics may also be considered when performing an attribution process as described herein.

Once the system determines appropriate attributions of memory usage, this information may be aggregated to provide a meaningful picture of memory usage by development components. For example, the system may provide this information in a form within a development environment (e.g. in conjunction with memory debugging tools) to allow a developer, for example to manipulate the data. In addition, the information may be provided in various representations. FIGS. 8-11 illustrate various representations that may be created to provide attributed memory usage information according to embodiments of the disclosure.

Figure 8:
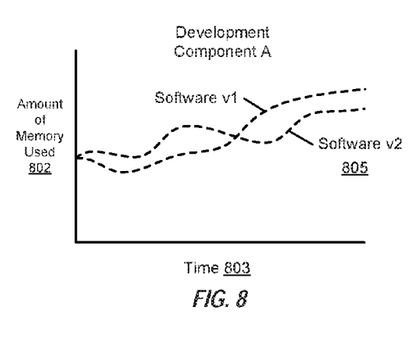
FIG. 8 illustrates an example line graph of memory usage for a development component across a period of time for different software versions according to an embodiment of the disclosure.

FIG. 8 illustrates an example line graph of memory usage for a particular development component across a period of time for different software versions according to an embodiment of the disclosure. As shown, the amount of memory used 802 may be displayed across a period of time 803 for a particular development component within various software versions 805 (or builds) of an application (e.g. operating system). Accordingly, a developer may determine whether fluctuations in memory usage of a particular development component have increased or changed between software versions. In addition, the developer may adjust the time frame from which memory usage is retrieved (e.g. more aggressive time frames) depending on the particular development component being analyzed.

Figure 9:
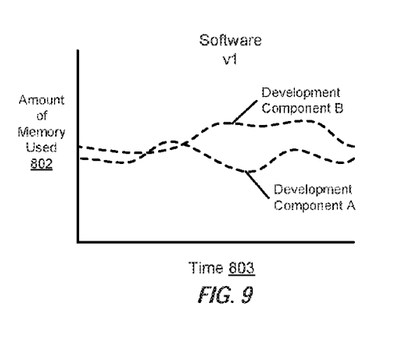
FIG. 9 illustrates an example line graph of memory usage of different development components across a period of time according to an embodiment of the disclosure.

FIG. 9 illustrates an example line graph of memory usage of different development components across a period of time according to an embodiment of the disclosure. As shown, the amount of memory used 802 may be displayed across a period of time 803 for various development components (e.g. development components A and B) for a particular software version. Accordingly, a developer may compare the memory usage of development components, for example, to determine which development components may be contributing to an increase of overall memory usage for a particular software version.

Figure 10:
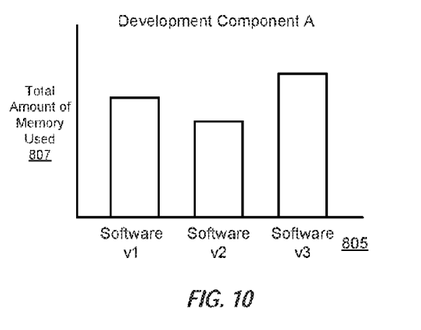
FIG. 10 illustrates an example bar chart of the total amount of memory used for a particular development component across software versions according to an embodiment of the disclosure.

FIG. 10 illustrates an example bar chart of the total amount of memory used for a particular development component across software versions according to an embodiment of the disclosure. As shown, the total amount of memory used 807 may be displayed across software versions for a particular component. Accordingly, a developer may determine whether the total amount memory used by a particular development component has increased between software versions.

Figure 11:
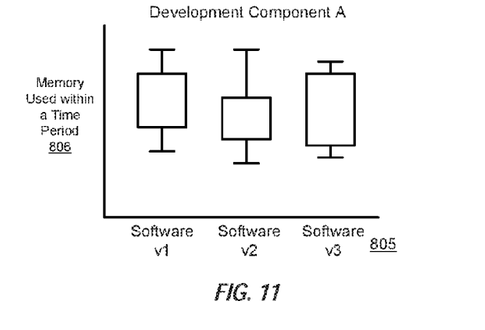
FIG. 11 illustrates an example candlestick chart of the amount of memory used within a time period for a particular development component across various software versions according to an embodiment of the disclosure.

FIG. 11 illustrates an example candlestick chart of the amount of memory used within a time period for particular development components across various software versions according to an embodiment of the disclosure. As shown, memory used within a time period 806 may be shown. For example, one end of the candlestick bar may correspond to the start of the time period and the other end of the candlestick bar may correspond to the end of the time period. Accordingly, a developer may determine whether a particular development component undergoes various spikes or dips of memory usage across a particular timeframe, and these fluctuations, may be compared across various software versions. For example, a developer may determine whether certain memory spikes that occur within a particular time period were present in previous software versions.

It should be noted that the above charts are merely examples and the system may provide a countless number of additional representations based on the system determining development-component-based memory usage. Accordingly, it is contemplated that various combinations of variables including software versions, components, build versions, time frames, etc. may be provided for comparing memory usage based on the information derived from the techniques described above.

Figure 12:
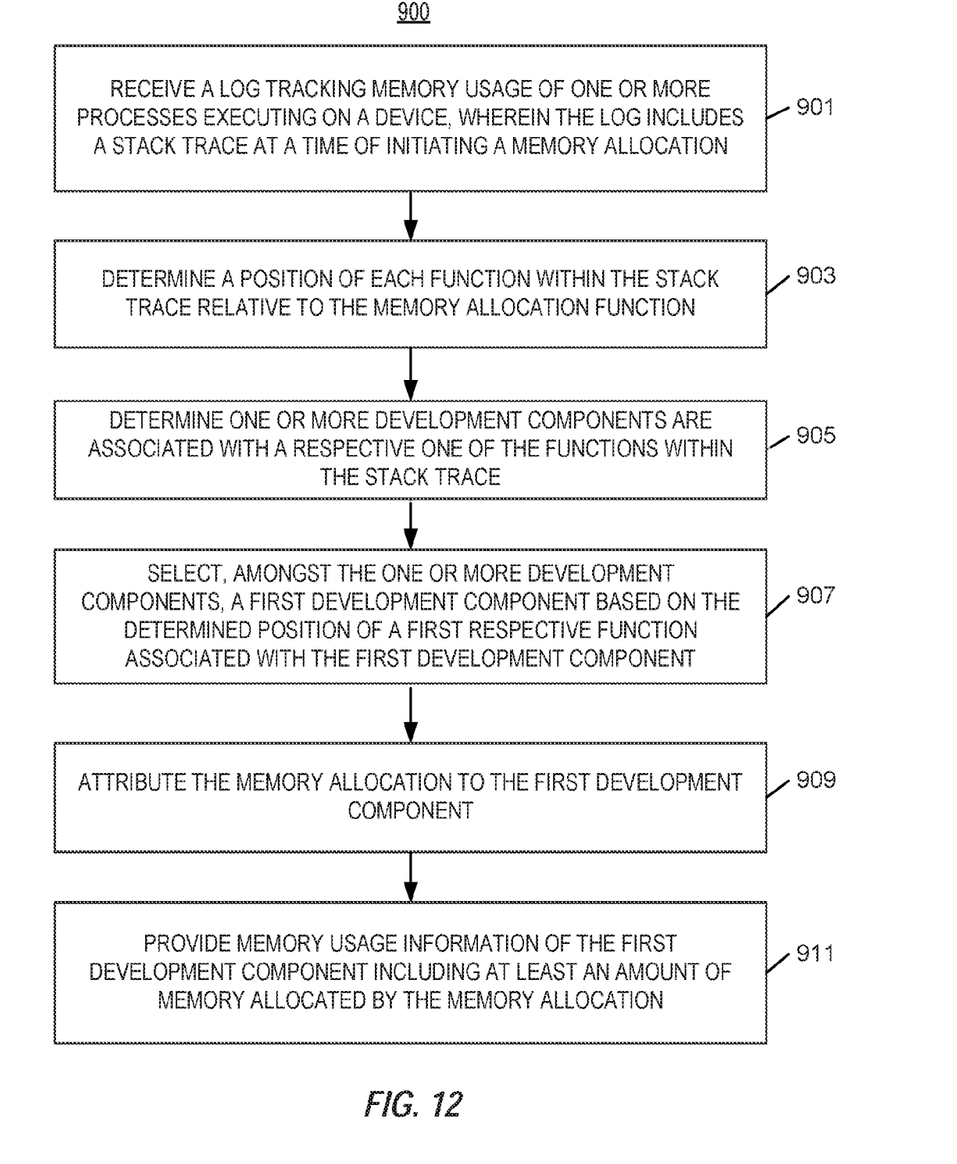
FIG. 12 is an example flow diagram of a method of providing information of the memory usage attributable to a development component according to an embodiment of the disclosure.

FIG. 12 is an example flow diagram illustrating a method of providing information of the memory usage attributable to a development component according to an embodiment of the disclosure. Process 900 may use processing logic, which may include software, hardware, or a combination thereof. For example, process 900 may be performed by one or more components of system 100 (e.g. server 140). In 901, the system may receive a log tracking memory usage of one or more processes executing on a device. For example, the log may include a stack trace at a time of (or upon) initiating a memory allocation function by one of the processes. In one embodiment, the system may convert memory addresses listed in the stack trace to a corresponding list of functions. For example, a list of return addresses may be converted into functions names called by one or more processes. In 903, the system may determine a position of each function within the stack trace relative to the memory allocation function.

In 905, the system may determine one or more development components are associated with a respective one of the functions within the stack trace. In one embodiment, determining one or more development components are associated with a respective one of the functions within the stack trace may be based on a predefined list of associations between the development components and the functions. In one embodiment, the system may analyze the stack trace by traversing the stack. For example, the system may traverse frames of the stack trace as shown in the example of FIG. 5. For instance, the system may traverse the frames of the stack trace starting from a frame corresponding to a start of a processing thread (e.g. frame 410) to a frame corresponding to the memory allocation function (e.g. frame 440). In one embodiment, the frame corresponding to the start of the processing thread corresponds to the frame created in response to initiating the processing thread, and the frame corresponding to the memory allocation function corresponds to a frame created in response to initiating the memory allocation. In addition, in one embodiment, the analysis may be performed as a heuristic process.

In 907, the system may select, amongst the one or more development components, a first development component based on the determined position of a first respective function associated with the first development component. In one embodiment, this may include determining that the first function is nearest the memory allocation function amongst the respective functions that are associated with the one or more development components. In one embodiment, each of the one or more development components may be associated with an association type that characterizes a strength of the association between each development component and the respective function, and accordingly, selecting the first development component may be further based on the association type associated with the first development component. In one embodiment, the association type may include either a first-type of association or a second-type of association, and the first-type of association may indicate a stronger association than the second-type of association. In one embodiment, the association type may include either a strong association or a weak association.

Accordingly, selecting the first development component may include determining that the first function is nearest the memory allocation function amongst the respective functions that are associated with the one or more development components and determining that the first development component is associated with the first-type of association. In one embodiment, the one or more development components may include a second development component, wherein the determined position of a second respective function associated with the second development component is closer to the memory allocation function than the first function. Accordingly, in such a scenario, selecting the first development component may include selecting the first development component over the second development component based on the first development component being associated with the first-type of association (e.g. strong association) and the second development component being associated with the second-type of association (e.g. weak association).

In 909, the system may attribute the memory allocation function to the first development component. In one embodiment, the first development component may include a predefined subset of software components of a framework. For example, the subset of components may include one or more of a collection of libraries, processes, services, classes, and objects. In addition, in one embodiment, the first development component may be associated with a predefined software development project or team.

In 911, the system may provide memory usage information of the first development component. In one embodiment, the memory usage information may include at least an amount of memory allocated by the memory allocation function. For example, the memory usage information of the development component may include providing an amount of memory usage attributable to the development component across a period of time (e.g. as shown in FIG. 9). In another example, memory usage information of the development component may include providing a comparison of an amount of memory usage attributable to the development component for different build versions of an application installed on the device (e.g. as shown in FIG. 10).

Figure 13:
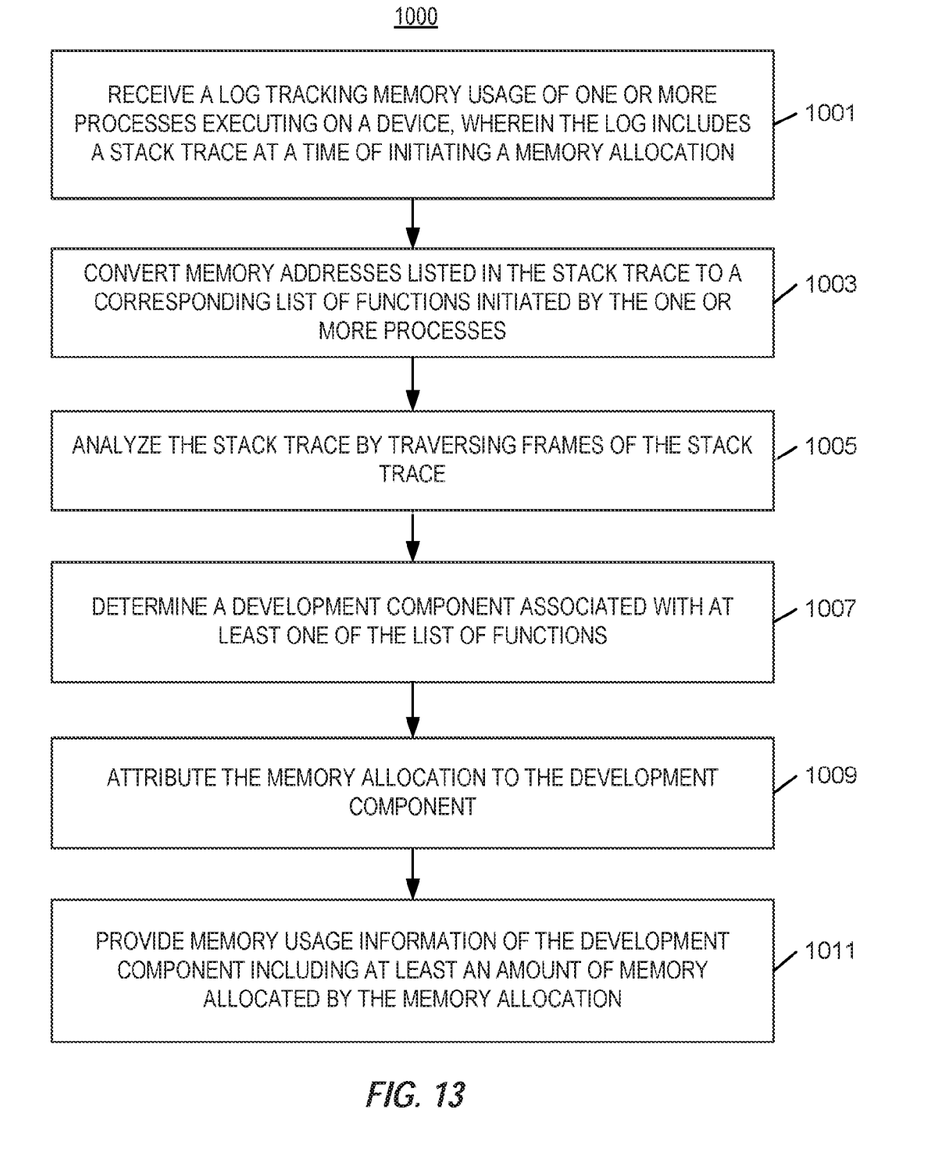
FIG. 13 is an example flow diagram of another method of providing information of the memory usage attributable to a development component according to an embodiment of the disclosure.

FIG. 13 is an example flow diagram illustrating another method of providing information of the memory usage attributable to a development component according to an embodiment of the disclosure. Process 1000 may use processing logic, which may include software, hardware, or a combination thereof. For example, process 1000 may be performed by one or more components of system 100 (e.g. server 140). In 1001, the system may receive a log tracking memory usage of one or more processes executing on a device. For example, the log may include a stack trace at a time of initiating a memory allocation function by one of the processes. In 1003, the system may convert memory addresses listed in the stack trace to a corresponding list of functions. For example, a list of return addresses may be converted into functions names called by one or more processes. In 1005, the system may analyze the stack trace by traversing the stack. For example, the system may traverse the frames as shown in the example of FIG. 5. For instance, the system may traverse the frames of the stack trace starting from a frame corresponding to a start of a processing thread (e.g. frame 410) to a frame corresponding to the memory allocation function (e.g. frame 440). In one embodiment, the frame corresponding to the start of the processing thread corresponds to the frame created in response to initiating the processing thread, and the frame corresponding to the memory allocation function corresponds to a frame created in response to initiating the memory allocation.

In 1007, the system may determine a development component is associated with at least one of the list of functions. In 1009, the system may attribute the memory allocation function to the development component. In one embodiment, each function of a subset of the list of functions may be associated with a respective development component, and accordingly, the development component attributed with the memory allocation may be a first respective development component associated with a first function of the subset that is positioned nearest the memory allocation function. In addition, in one embodiment, each of the respective development components may be classified as either a strong association or a weak association. Accordingly, a second respective development component that is a strong association may override (or selected over) the first respective development component that is a weak association as the development component attributed with the memory allocation. Accordingly, the second respective development component may override the first respective development component even when the second respective development component is associated with a second function of the subset that is positioned farther from the memory allocation than the first function.

In 1011, the system may provide memory usage information of the development component. In one embodiment, the memory usage information may include at least an amount of memory allocated by the memory allocation function. Thus, in 1011, the system may provide memory usage information of the development component as described above.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 14:
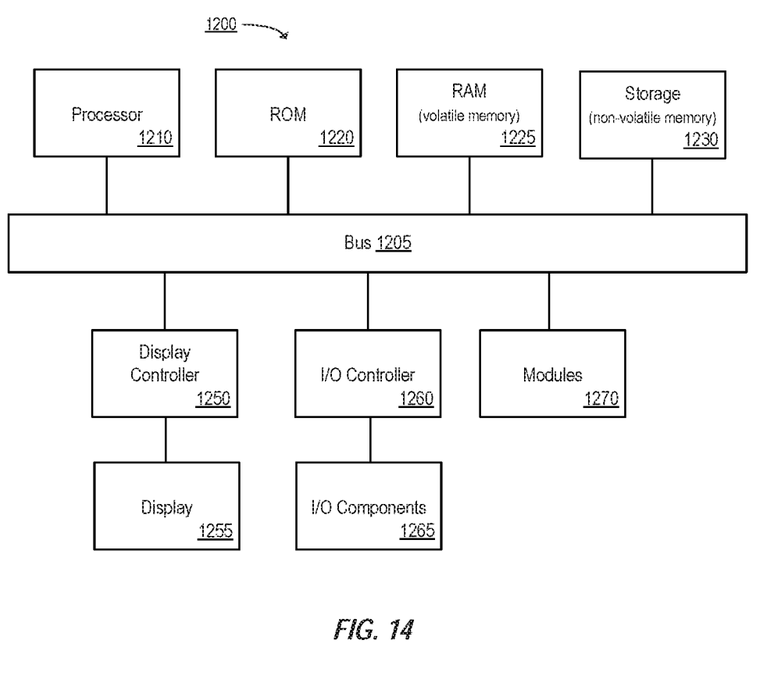
FIG. 14 is a block diagram illustrating an example computing system which may be used in conjunction with one or more of the embodiments of the disclosure.

FIG. 14 is a block diagram illustrating an example computing system, which may be used in conjunction with one or more of the embodiments of the disclosure. For example, computing system 1200 (or system, or computing device, or device) may represent any of the systems (e.g. system 100), or devices described herein (e.g. server 140 or client device 110) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium (or computer-readable medium, or storage) containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the modules described above, such as, for example, collection module 145, analysis module 150, memory address converting module 152, and tools 160 (and related modules, and sub-modules). Modules 1270 may reside, completely or at least partially, within the memories described above, or within a processor during execution thereof by the computing system. In addition, modules 1270 can be implemented as software, firmware, or functional circuitry within the computing system, or as combinations thereof.

In addition, the present disclosure recognizes that the use of such data (e.g. memory usage data or personal information data), in the present technology, can be used to the benefit of users. The present disclosure further contemplates that the entities responsible for the collection, analysis, disclosure, transfer, storage, or other use of such data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of data (e.g. personal information data) during registration for services.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:

receiving a log tracking memory usage of one or more processes executing on a device, wherein the log includes a stack trace at a time of initiating a memory allocation function;

determining a position of each function within the stack trace relative to the memory allocation function;

determining one or more development components are associated with a respective one of the functions within the stack trace;

selecting, amongst the one or more development components, a first development component based on the determined position of a first respective function associated with the first development component;

attributing the memory allocation function to the first development component; and providing memory usage information of the first development component including at least an amount of memory allocated by the memory allocation function.

2. The medium of claim 1, wherein the first development component comprises a predefined subset of software components of a framework, wherein the subset of components comprises one or more of a collection of libraries, processes, services, classes, and objects.

3. The medium of claim 2, wherein the first development component is associated with a predefined software development project or team.

4. The medium of claim 1, wherein selecting the first development component based on the determined position of the first respective function includes determining that the first respective function is nearest the memory allocation function amongst the respective functions that are associated with the one or more development components.

5. The medium of claim 1, wherein each of the one or more development components is associated with an association type that characterizes a strength of the association between each development component and the respective function, and wherein selecting the first development component is further based on the association type associated with the first development component.

6. The medium of claim 5, wherein the association type comprises either a first-type of association or a second-type of association, wherein the first-type of association indicates a stronger association than the second-type of association.

7. The medium of claim 6, wherein selecting the first development component includes
   determining that the first respective function is nearest the memory allocation function amongst the respective functions that are associated with the one or more development components, and
   determining that the first development component is associated with the first-type of association.

8. The medium of claim 7, wherein the one or more development components include a second development component, wherein the determined position of a second respective function associated with the second development component is closer to the memory allocation function than the first respective function, and wherein selecting the first development component includes selecting the first development component over the second development component based on the first development component being associated with the first-type of association and the second development component being associated with the second-type of association.

9. The medium of claim 1, further comprising converting memory addresses listed in the stack trace to corresponding functions.

10. The medium of claim 1, wherein determining one or more development components are associated with a respective one of the functions within the stack trace is based on a predefined list of associations between the development components and the functions.

11. The medium of claim 1, wherein determining one or more development components are associated with a respective one of the functions within the stack trace includes traversing frames of the stack trace.

12. The medium of claim 11, wherein a frame corresponding to a bottom of the stack trace corresponds to a function initiating a processing thread and a frame corresponding to a top of the stack trace corresponds to the memory allocation function.

13. The medium of claim 1, wherein providing memory usage information of the development component includes providing an amount of memory usage attributable to the first development component across a period of time.

14. The medium of claim 1, wherein providing memory usage information of the first development component includes providing a comparison of an amount of memory usage attributable to the first development component for different build versions of an application installed on the device.

15. A method, comprising:
    receiving a log tracking memory usage of one or more processes executing on a device, wherein the log includes a stack trace upon initiating a memory allocation function;
    determining a position of each function within the stack trace relative to the memory allocation function, wherein the memory allocation is positioned on a top of the stack trace;
    determining one or more development components are associated with a respective one of the functions within the stack trace, wherein each of the one or more development components is associated with an association type that characterizes a strength of the association between each development component and the respective function;
    selecting, amongst the one or more development components, a first development component based on the determined position of a first respective function associated with the first development component, and the association type associated with the first development component;
    attributing the memory allocation function to the first development component; and
    providing memory usage information of the first development component including at least an amount of memory allocated by the memory allocation function.

16. The method of claim 15, wherein selecting the first development component based on the determined position of the first respective function includes determining that the first respective function is nearest the memory allocation function amongst the respective functions that are associated with the one or more development components.

17. The method of claim 16, wherein the association type that characterizes the strength of the association between each development component and the respective function comprises either a strong association or a weak association.

18. The method of claim 17, wherein the one or more development components include a second development component, wherein the determined position of a second respective function associated with the second development component is closer to the memory allocation function than the first respective function, and wherein selecting the first development component includes selecting the first development component over the second development component based on the association type between the first development component and the first respective function being strong and the association type between the second development component and the second respective function being weak.

19. The method of claim 15, wherein providing memory usage information of the first development component includes providing an amount of memory usage attributable to the first development component across a period of time.

20. The method of claim 15, wherein providing memory usage information of the first development component includes providing a comparison of an amount of memory usage attributable to the first development component for different build versions of an application installed on the device.

21. A device, comprising:
    a memory storing instructions; and a processor coupled to the device and the memory to execute the instructions from the memory, the processor being configured to perform operations, the operations comprising:
  receiving, at the device, a log tracking memory usage of one or more processes executing on the device, wherein the log includes a stack trace at a time of initiating a memory allocation function;
  converting memory addresses listed in the stack trace to a corresponding list of functions;
  determining a development component is associated with at least one of the list of functions;
  attributing the memory allocation function to the development component; and
  providing memory usage information of the development component including at least an amount of memory allocated by the memory allocation function.

22. The device of claim 21, wherein each function of a subset of the list of functions is associated with a respective development component, and wherein the development component attributed with the memory allocation function is a first respective development component associated with a first function, and the first function is positioned nearest the memory allocation function amongst the subset of functions.

* * * * *